United States Patent
Lin (10) Patent No.: US 9,662,831 B1
(45) Date of Patent: May 30, 2017

(54) BAND PRESSING DEVICE FOR EDGE BANDING MACHINE

(71) Applicant: Chin-Chi Lin, Taichung (TW)

(72) Inventor: Chin-Chi Lin, Taichung (TW)

(*) Notice: Subject to any disclaimer, the term of this patent is extended or adjusted under 35 U.S.C. 154(b) by 0 days.

(21) Appl. No.: 14/985,572

(22) Filed: Dec. 31, 2015

(51) Int. Cl.
| | | |
|---|---|---|
| *B29C 65/52* | (2006.01) | |
| *B29C 63/00* | (2006.01) | |
| *B32B 37/10* | (2006.01) | |
| *B32B 37/12* | (2006.01) | |

(52) U.S. Cl.
CPC ........ *B29C 65/526* (2013.01); *B29C 63/0026* (2013.01); *B32B 37/1027* (2013.01); *B32B 37/1036* (2013.01); *B32B 37/1284* (2013.01); *Y10T 156/103* (2015.01); *Y10T 156/1051* (2015.01); *Y10T 156/172* (2015.01); *Y10T 156/179* (2015.01); *Y10T 156/1717* (2015.01)

(58) Field of Classification Search
CPC ............ B32B 37/1027; B32B 37/1036; B32B 37/1284; B32B 38/1025; B32B 38/1033; Y10T 156/1028; Y10T 156/103; Y10T 156/1051; Y10T 156/12; Y10T 156/125; Y10T 156/1717; Y10T 156/172; Y10T 156/179
USPC .................................. 156/446, 447, 546, 486
See application file for complete search history.

(56) References Cited

U.S. PATENT DOCUMENTS

| | | | | |
|---|---|---|---|---|
| 4,246,059 A | * | 1/1981 | Hadl ...................... | B29C 53/42 156/191 |
| 5,246,533 A | * | 9/1993 | Mochizuki ............. | B27D 5/003 156/267 |
| 5,992,488 A | * | 11/1999 | Bortolini ................ | B23Q 1/012 156/351 |
| 6,263,938 B1 | | 7/2001 | Maioli et al. | |
| 8,430,144 B2 | | 4/2013 | Lin | |
| 8,443,858 B2 | * | 5/2013 | Lin ........................ | B27D 5/003 118/244 |
| 2012/0186515 A1 | * | 7/2012 | Lin ........................ | B27G 11/00 118/244 |
| 2012/0240846 A1 | | 9/2012 | Lin | |

FOREIGN PATENT DOCUMENTS

WO      2006076871      7/2006

* cited by examiner

*Primary Examiner* — Mark A Osele
*Assistant Examiner* — Nickolas Harm
(74) *Attorney, Agent, or Firm* — Akerman LLP; Peter A. Chiabotti (57) ABSTRACT

A band pressing device in an edge banding machine including a glue applying roller includes first and second resilient members. The first resilient member has a first resilient section spaced apart from the glue applying roller at a first distance. The first resilient section generates a first biasing force pressing an edge band against the glue applying roller when the edge band has a thickness larger than the first distance. The second resilient member has a second resilient section spaced apart from the first resilient section at a second distance. The second resilient section generates a second biasing force pressing the first resilient section against the edge band when the first resilient section is deformed to deform the second resilient section.

8 Claims, 8 Drawing Sheets

BAND PRESSING DEVICE FOR EDGE BANDING MACHINE

FIELD

The disclosure relates to a band pressing device, more particularly to a band pressing device for an edge banding machine.

BACKGROUND

Figure 1:
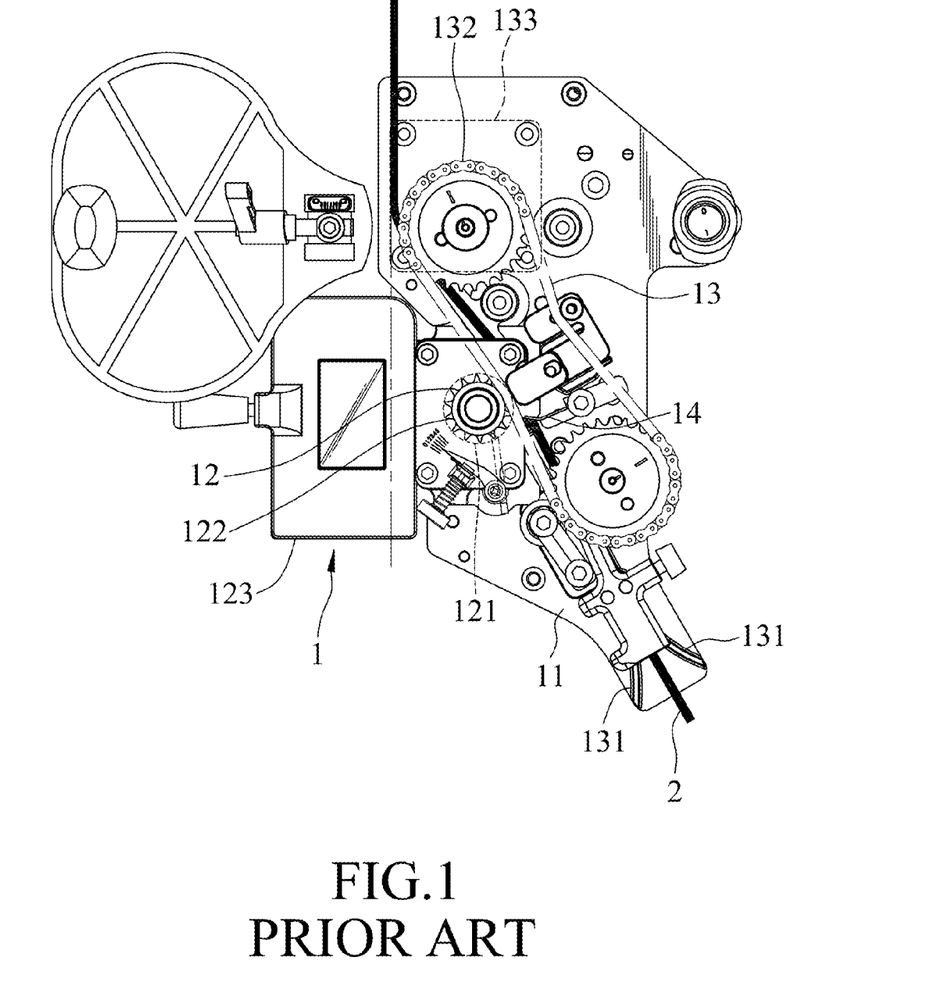
FIG. 1 is a schematic view of an edge banding machine of U.S. Pat. No. 8,430,144.

Referring to FIG. 1, an edge banding machine 1 of U.S. Pat. No. 8,430,144 includes a mounting plate 11, a glue applying unit 12, a transmission unit 13, and a band pressing member 14. The glue applying unit 12 includes a glue applying roller 121 disposed rotatably on the mounting plate 11 and having an outer peripheral surface, a driven gear 122 connected to and coaxially rotatable with the glue applying roller 121, and a glue container 123 for supplying a glue to the outer peripheral surface of the glue applying roller 121. The transmission unit 13 includes a guiding element 131 that is disposed on the mounting plate 11 for guiding an edge band 2 to move toward the glue applying roller 121, a transmission member 132 for driving the driven gear 122, and a motor 133 for driving the transmission member 132. The band pressing member 14 is used for generating a biasing force that presses the edge band 2 against the outer peripheral surface of the glue applying roller 121, such that the glue is applied onto the edge band 2.

However, the thickness of the edge band 2 may be changed based on actual requirements. For the edge band 2 with a small thickness, the biasing force generated by the band pressing member 14 may cause the edge band 2 to wrinkle and be wound around the glue applying roller 121, resulting in damage of the edge band 2 and even the edge banding machine 1. For the edge band 2 with a large thickness, the biasing force generated by the band pressing member 14 may be insufficient to press the edge band 2 against the outer peripheral surface of the glue applying roller 121 and to allow the glue to be evenly applied onto the edge band 2. As a result, a distance between the band pressing member 14 and the outer peripheral surface of the glue applying roller 121 needs to be manually adjusted base on the thickness of the edge band 2, resulting in inconvenient operation.

SUMMARY

Therefore, an object of the disclosure is to provide a band pressing device for an edge banding machine that can alleviate at least one of the drawbacks associated with the prior arts.

According to the present disclosure, a band pressing device is used in an edge banding machine. The edge banding machine includes a mounting plate, a glue applying roller disposed rotatably on the mounting plate and having an outer peripheral surface, and a transmission unit disposed on the mounting plate for guiding an edge band to move toward the glue applying roller. The band pressing device includes a first resilient member and a second resilient member.

The first resilient member has a first fixed section disposed fixedly on the mounting plate, and a first resilient section connected to the first fixed section and spaced apart from the outer peripheral surface of the glue applying roller at a first distance for permitting the edge band to pass through a space between the first resilient section of the first resilient member and the outer peripheral surface of the glue applying roller. The first resilient section generates a first biasing force that presses the edge band against the outer peripheral surface of the glue applying roller when the edge band has a thickness larger than the first distance.

The second resilient member has a second fixed section disposed fixedly on the mounting plate, and a second resilient section connected to the second fixed section and spaced apart from the first resilient section of the first resilient member at a second distance. The second resilient section generates a second biasing force that presses the first resilient section of the first resilient member against the edge band when the first resilient section of the first resilient member is deformed to contact and deform the second resilient section.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 2:
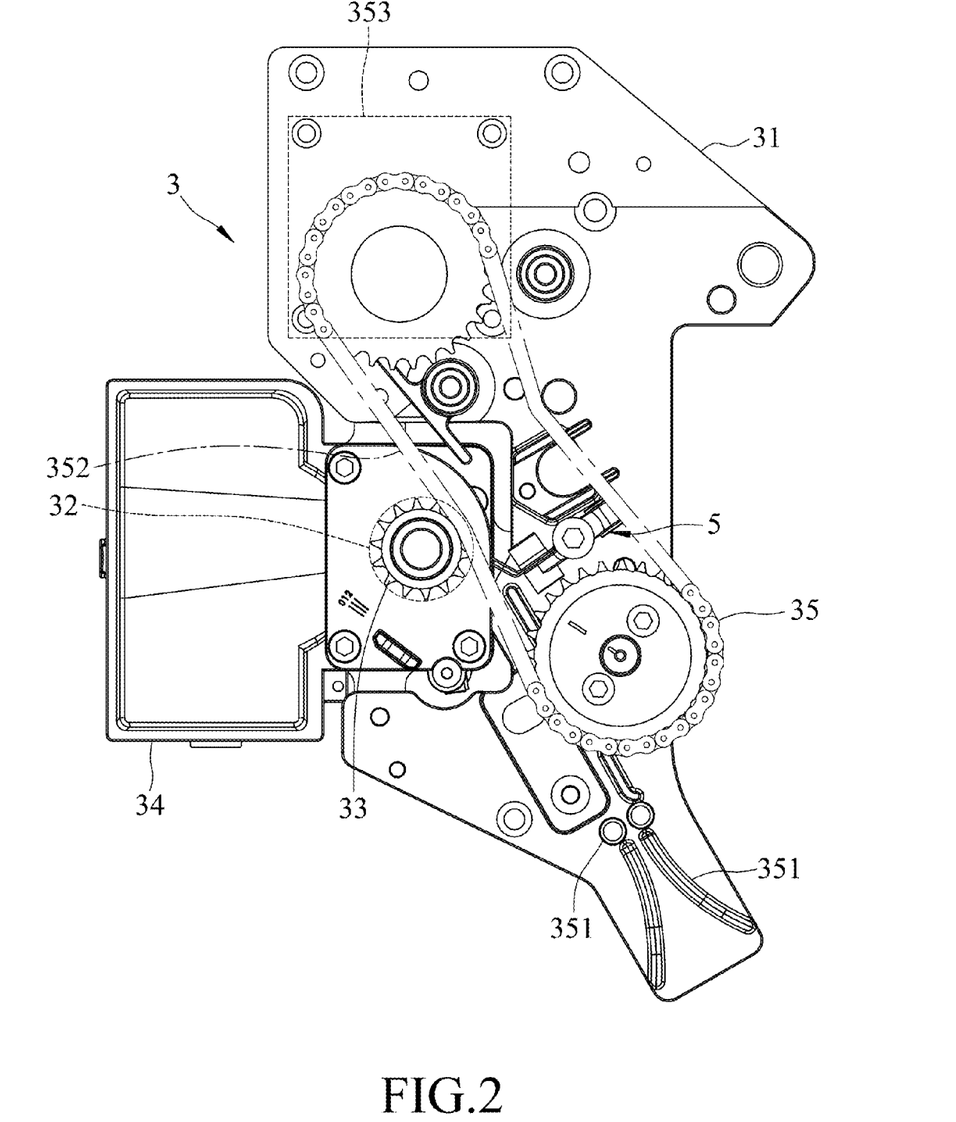
FIG. 2 is a schematic view of an embodiment of a band pressing device of the disclosure that is used in an edge banding machine.

Referring to FIG. 2, an embodiment of a band pressing device of the disclosure is used in an edge banding machine 3. The edge banding machine 3 includes a mounting plate 31, a glue applying roller 32, a driven gear 33, a glue container 34, and a transmission unit 35. The glue applying roller 32 is disposed rotatably on the mounting plate 31, and has an outer peripheral surface 321. The driven gear 33 is coaxial with and co-rotatable with the glue applying roller 32. The glue container 34 is used for supplying a glue to the outer peripheral surface 321 of the glue applying roller 32. The transmission unit 35 is disposed on the mounting plate 31 for guiding an edge band 4 to move toward the glue applying roller 32.

To be more specific, the transmission unit 35 includes a guiding element 351 that is disposed on the mounting plate 31 for moving the edge band 4 toward the glue applying roller 32, a transmission member 352 for driving the driven gear 33, and a motor 353 for driving the transmission member 352. The guiding element 351 may be a guiding rail, a gilding roller, etc., as long as the guiding element 351 is capable of guiding the edge band 4 to move toward the glue applying roller 32. Since the technique of using the guiding element 351 to guide the edge band 4 is well known in the art, detail description of the technique will not be further presented hereinafter.

Figure 3:
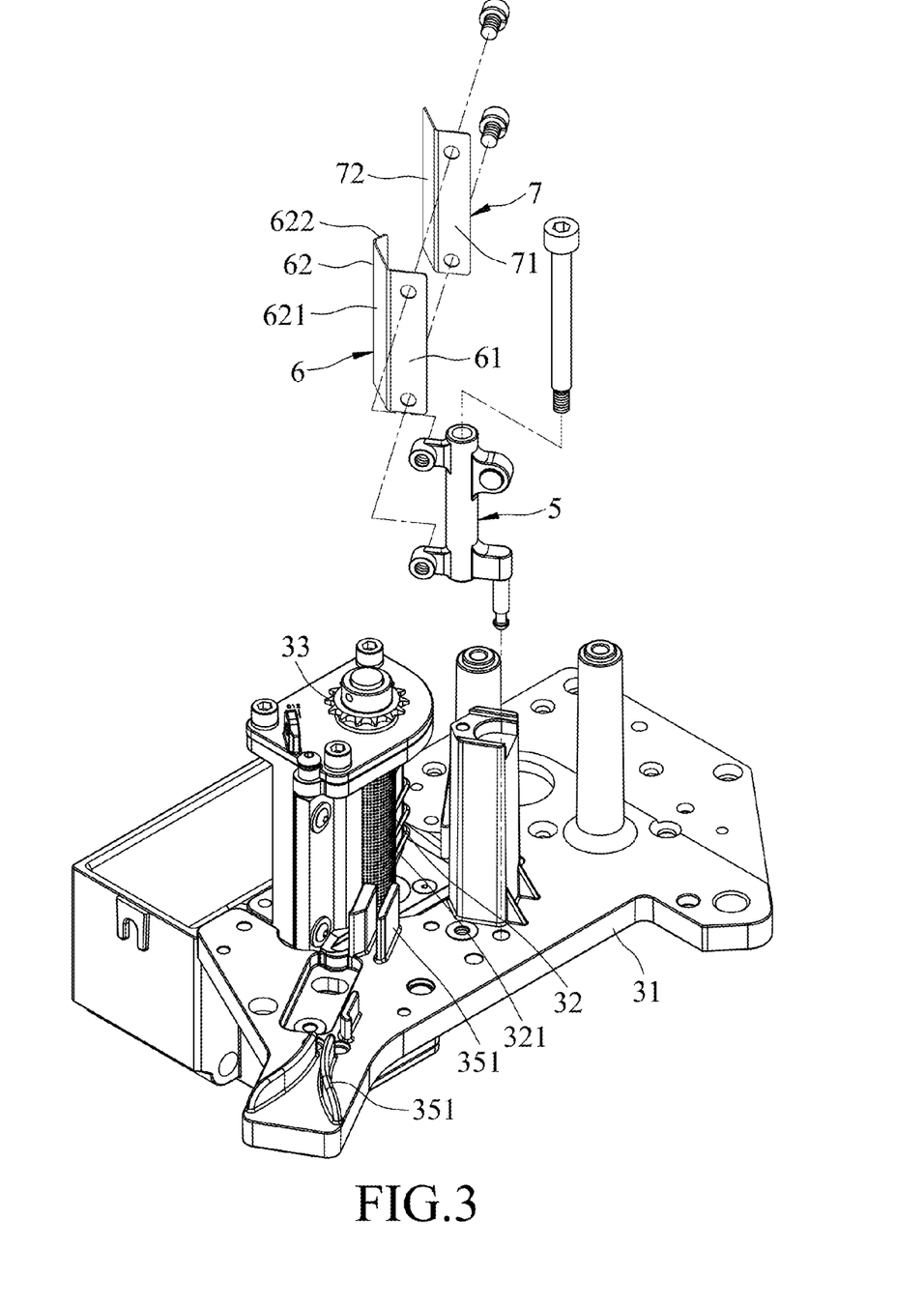
FIG. 3 is an exploded perspective view of the embodiment shown with the edge banding machine.
Figure 4:
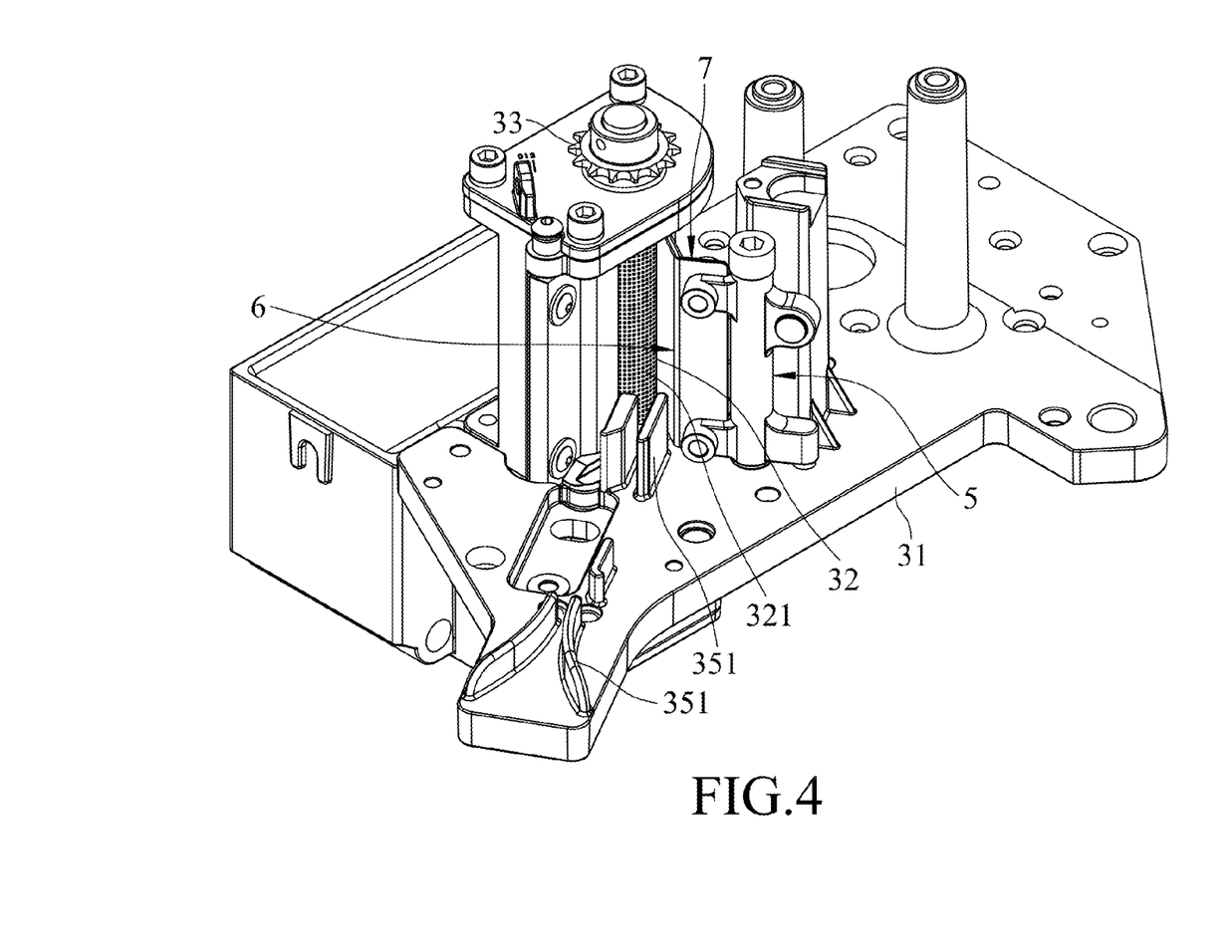
FIG. 4 is a schematic perspective view showing the embodiment being installed on a mounting plate of the edge banding machine.
Figure 5:
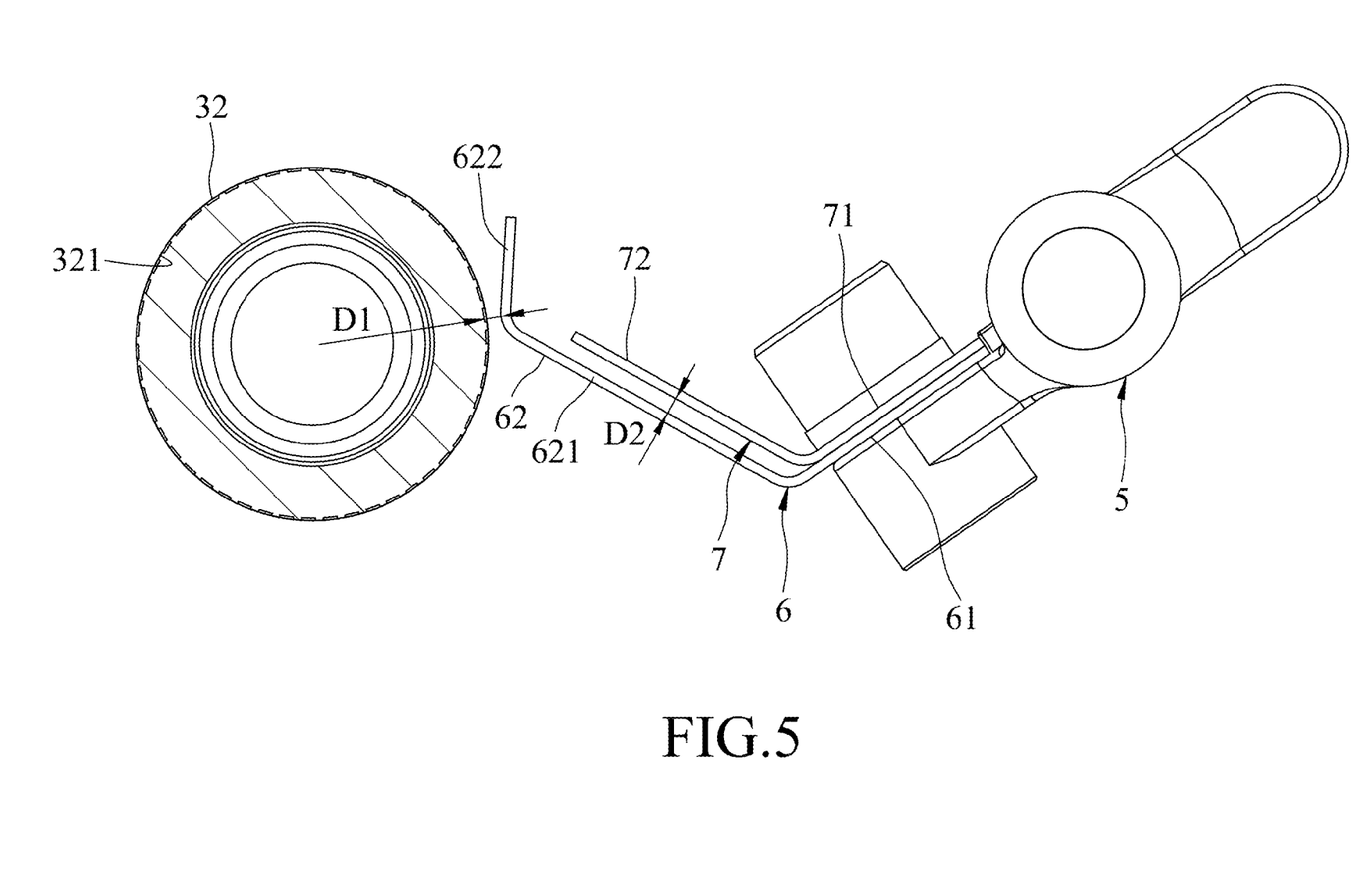
FIG. 5 is a schematic top view showing an arrangement of the embodiment and the edge banding machine.

Referring to FIGS. 3 to 5, the band pressing device includes a supporting frame 5, a first resilient member 6, and a second resilient member 7.

The supporting frame 5 is disposed on the mounting plate 31 and is spaced apart from and adjacent to the glue applying roller 32.

The first resilient member 6 has a first fixed section 61 and a first resilient section 62. The first fixed section 61 is connected fixedly to the supporting frame 5, such as by screws, so that the first fixed section 61 is disposed fixedly on the mounting plate 31. The first resilient section 62 is connected to the first section 61, and is spaced apart from the outer peripheral surface 321 of the glue applying roller 32 at a first distance (D1) for permitting the edge band 4 to pass through a space between the first resilient section 62 of the first resilient member 6 and the outer peripheral surface 321 of the glue applying roller 32. To be more specific, the first resilient section 62 has an extending segment 621 connected to the first fixed section 61, and an abutting segment 622 connected to the extending segment 621. The abutting segment 622 forms a first angle with the extending segment 621, and is spaced apart from the outer peripheral surface 321 of the glue applying roller 32 at the first distance (D1). The extending segment 621 forms a second angle with the first fixed section 61. The first resilient section 62 generates a first biasing force that presses the edge band 4 against the outer peripheral surface 321 of the glue applying roller 32 when the edge band 4 has a thickness larger than the first distance (D1).

The second resilient member 7 has a second fixed section 71 and a second resilient section 72. The second fixed section 71 overlaps the first fixed section 61 of the first resilient member 6, forms a third angle with the second resilient section 72, and is connected fixedly to the supporting frame 5, such as by screws, so that the second fixed section 71 is disposed fixedly on the mounting plate 31. The second resilient section 72 is connected to the second fixed section 71, extends parallel to the extending segment 621, and is spaced apart from the first resilient section 62 at a second distance (D2). The second resilient section 72 generates a second biasing force that presses the first resilient section 62 against the edge band 4 when the first resilient section 62 is deformed to contact and deform the second resilient section 72.

In this embodiment, each of the first resilient member 6 and the second resilient member 7 is a spring plate. In certain embodiments, the second resilient member 7 may be a compression spring (not shown) that has a first end and a second end opposite to each other. The first end is connected fixedly to another support frame (not shown). The second end is a free end adjacent to and spaced apart from the abutting segment 622 of the first resilient section 62 of the first resilient member 6 by the second distance (D2).

Figure 6:
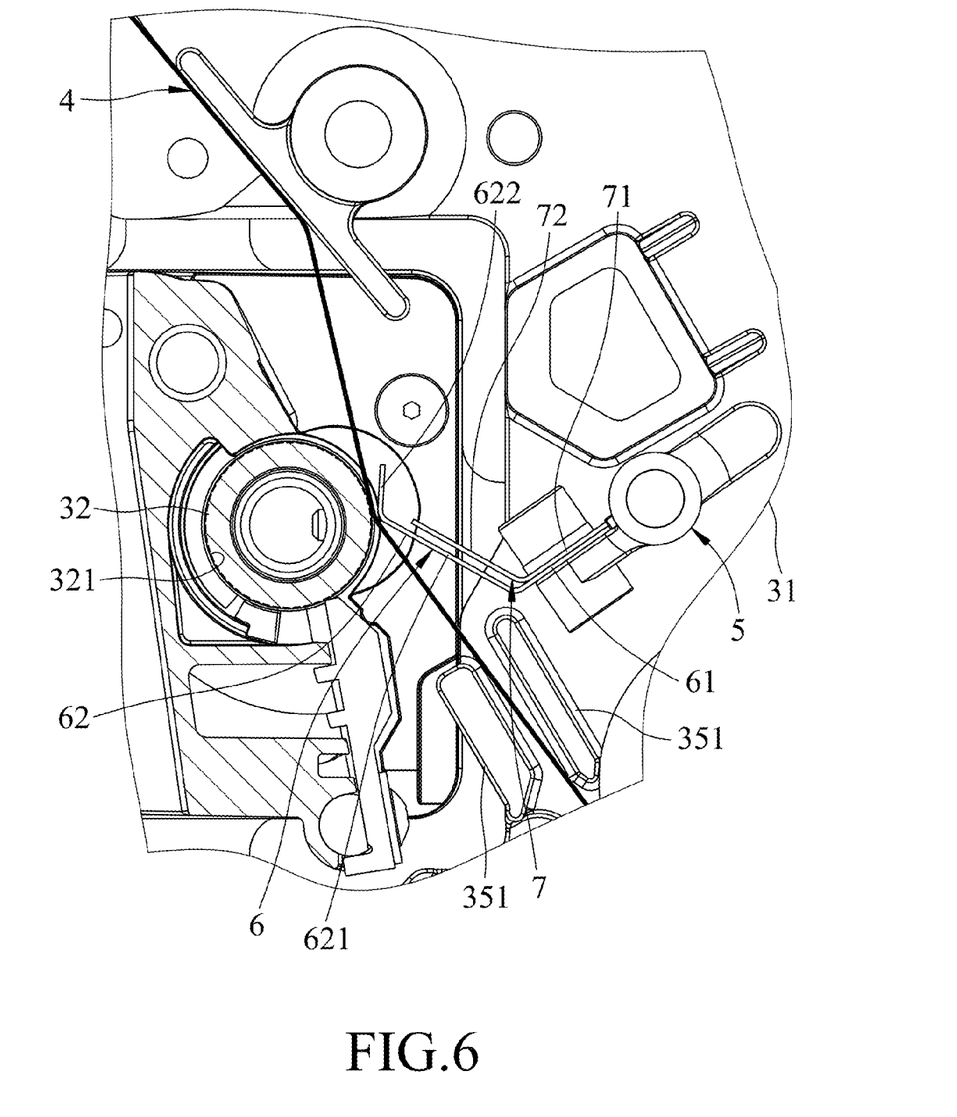
FIGS. 6 to 8 are schematic top views showing edge bands of different thicknesses passing through the edge banding machine.

Referring to FIGS. 5 and 6, when the edge band 4 has a thickness smaller than the first distance (D1), the first resilient section 62 of the first resilient member 6 is not in contact with the edge band 4 and is not deformed. Therefore, the edge band 4 is in contact with the outer peripheral surface 321 of the glue applying roller 32 without the influence of the first biasing force, and the glue can be evenly applied onto the edge band 4.

Figure 7:
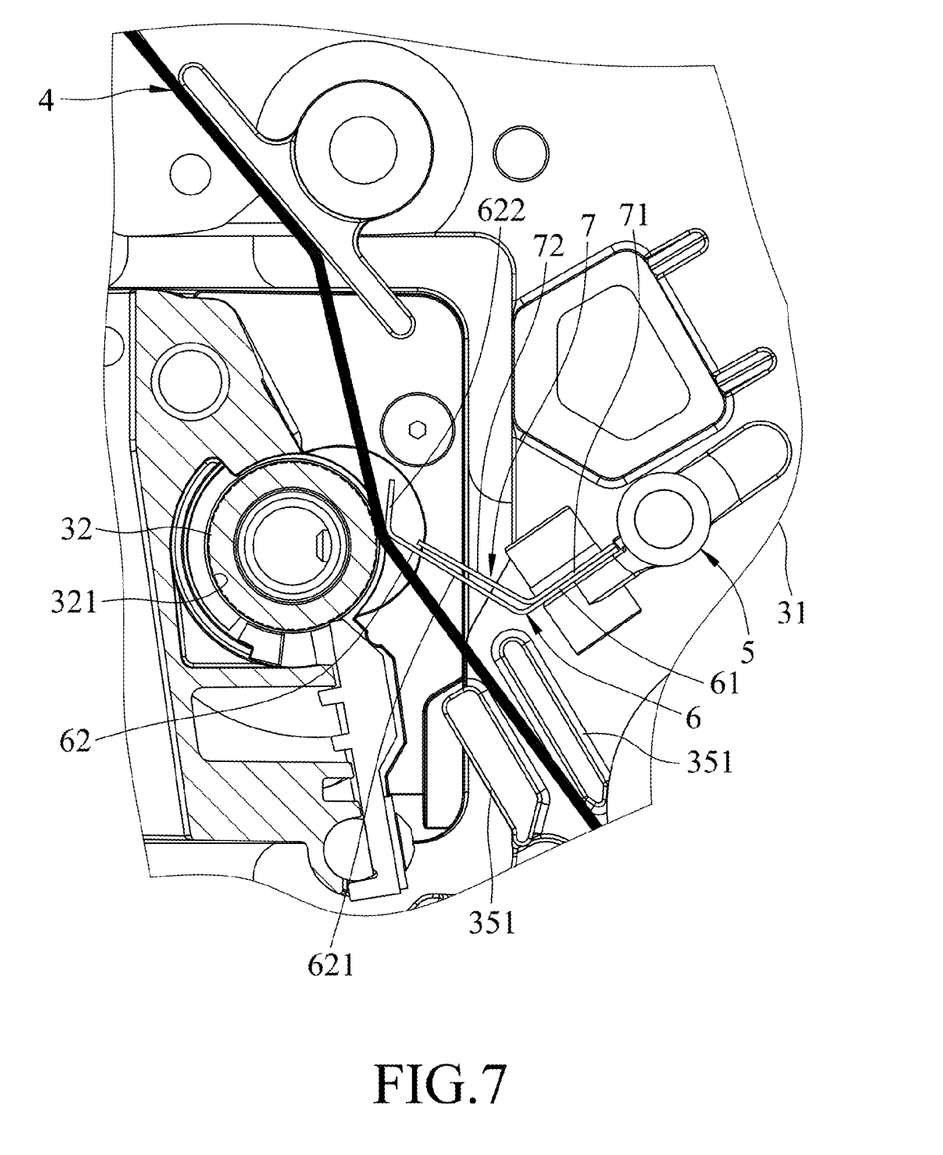

Referring to FIGS. 5 and 7, when the edge band 4 has a thickness that is slightly larger than the first distance (D1), so that the first resilient section 62 is deformed and the second resilient section 72 is not deformed, the abutting segment 622 of the first resilient section 62 generates the first biasing force to press the edge band 4 against the outer peripheral surface 321 of the glue applying roller 32, such that a portion of the edge band 4 tightly contacts the outer peripheral surface 321 of the glue applying roller 32 and the glue can be evenly applied onto the edge band 4.

Figure 8:
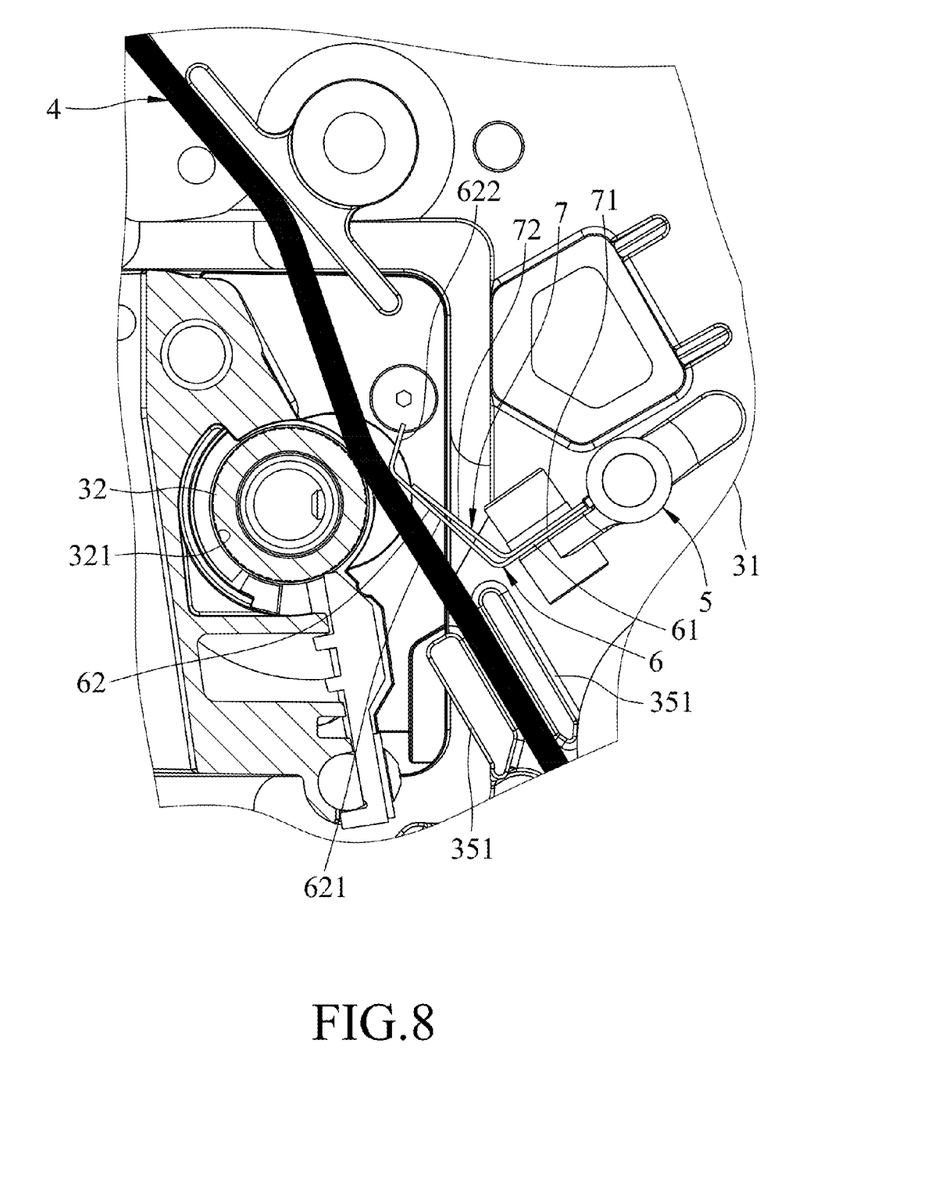

Referring to FIGS. 5 and 8, when the edge band 4 has a thickness that is markedly larger than the first distance (D1), so that the first and second resilient sections 62, 72 are both deformed, the second resilient section 72 generates the second biasing force to press the first resilient section 62 against the edge band 4, and a combination of the first and second biasing forces is applied onto the edge band 4 to press the edge band 4 against the outer peripheral surface 321 of the glue applying roller 32, such that a portion of the edge band 4 tightly contacts the outer peripheral surface 321 of the glue applying roller 32 and the glue can be evenly applied onto the edge band 4.

In summary, a biasing force applied to the edge band 4 can be adjusted automatically through two-step band pressing operation of the first resilient member 6 and the second resilient member 7 based on the thickness of the edge band 4. For the edge band 4 with thinner thickness, the biasing force is not be applied or a smaller biasing force (i.e., the first biasing force) is applied to the edge band 4, ensuring the glue to be evenly applied onto the edge band 4 and avoiding the edge band 4 from wrinkling and being wound around the glue applying roller 32. For the edge band 4 with larger thickness, a larger biasing force (i.e., the combination of the first and second biasing forces) is applied to the edge band 4, ensuring a portion of the edge band 4 to tightly contact the outer peripheral surface 321 of the glue applying roller 32 so as to allow the glue to be evenly applied onto the edge band 4.

While the disclosure has been described in connection with what are considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A band pressing device adapted to be used in an edge banding machine, the edge banding machine including a mounting plate, a glue applying roller that is disposed rotatably on the mounting plate and that has an outer peripheral surface, and a transmission unit that is disposed on the mounting plate for guiding an edge band to move toward the glue applying roller, said band pressing device comprising:
    a first resilient member that has a first fixed section disposed fixedly on the mounting plate, and a first resilient section connected to said first fixed section and spaced apart from the outer peripheral surface of the glue applying roller at a first distance for permitting the edge band to pass through a space between said first resilient section of said first resilient member and said outer peripheral surface of said glue applying roller, said first resilient section generating a first biasing force that presses the edge band against the outer peripheral surface of the glue applying roller when the edge band has a thickness larger than the first distance; and
    a second resilient member that has a second fixed section disposed fixedly on the mounting plate, and a second resilient section connected to said second fixed section and spaced apart from said first resilient section of said first resilient member at a second distance, said second resilient section generating a second biasing force that presses said first resilient section of said first resilient member against the edge band when said first resilient section of said first resilient member is deformed to contact and deform said second resilient section.

2. The band pressing device as claimed in claim 1, further comprising a supporting frame that is disposed on the mounting plate and that is spaced adjacent to the glue applying roller, said first fixed section of said first resilient member being connected fixedly to said supporting frame.

3. The band pressing device as claimed in claim 2, wherein said first resilient section of said first resilient member has an extending segment that is connected to said first fixed section, and an abutting segment that is connected to said extending segment, that forms a first angle with said extending segment, and that is spaced apart from the outer peripheral surface of the glue applying roller at the first distance.

4. The band pressing device as claimed in claim 3, wherein said extending segment of said first resilient section forms a second angle with said first fixed section.

5. The band pressing device as claimed in claim 3, wherein said second fixed section of said second resilient member is connected fixedly to said supporting frame.

6. The band pressing device as claimed in claim 5, wherein said second fixed section of said second resilient member overlaps said first fixed section of said first resilient member, and forms a third angle with said second resilient section.

7. The band pressing device as claimed in claim 6, wherein said second resilient section of said second resilient member extends parallel to said extending segment of said first resilient section of said first resilient member.

8. The band pressing device as claimed in claim 1, wherein each of said first resilient member and said second resilient member is a spring plate.

* * * * *